United States Patent [19]

Brooker

[11] 4,203,941
[45] May 20, 1980

[54] BALL AND METHOD FOR MAKING IT

[76] Inventor: Bernard F. Brooker, Silver Birches, Balcombe Rd., Crawley, Sussex, England

[21] Appl. No.: 973,596

[22] Filed: Dec. 27, 1978

[51] Int. Cl.² ............ A63B 37/12; A63B 45/00; B29C 27/00; B29D 9/00
[52] U.S. Cl. .................. 264/250; 40/327; 264/263; 264/274; 264/275; 264/328; 273/60 B; 273/217; 273/220
[58] Field of Search ............ 264/271, 275, 263, 259, 264/274, 328, 250; 273/63 R, 63 E, 58 RA, 60 R, 60 A, 60 B, 59 A, 59 R, 228, 233, 235 R, 215, 230, 232, 217, 220; 40/327

[56] References Cited

U.S. PATENT DOCUMENTS

| | | | |
|---|---|---|---|
| 1,182,605 | 5/1916 | Wadsworth | 273/215 |
| 1,482,232 | 1/1924 | Hazeltine | 273/233 |
| 2,376,085 | 5/1945 | Radford et al. | 264/328 |
| 3,256,019 | 6/1966 | Barton | 273/60 R |

FOREIGN PATENT DOCUMENTS 237580 4/1960 Australia ................. 273/220
1321270 6/1973 United Kingdom .

Primary Examiner—W. E. Hoag
Attorney, Agent, or Firm—Toren, McGeady and Stanger

[57] ABSTRACT

In moulding a ball consisting of a cover on a hard spherical core, e.g. a base ball, or a golf ball, one of the problems is maintaining accurate location of the core in the ball. According to the invention the core is surrounded by a moulded shell having co-spherical projections which support the ball in a spherical mould in which the cover is moulded on. The shell may be of two half shells clipped together.

7 Claims, 5 Drawing Figures

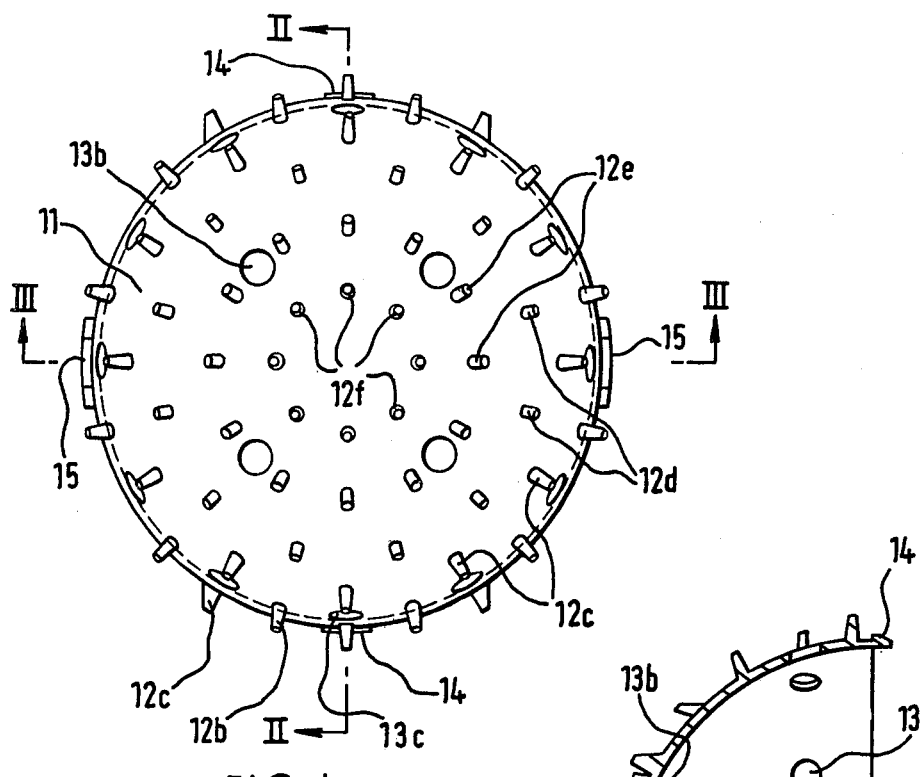
FIG.1.
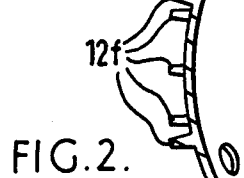
FIG.2.
FIG.3.
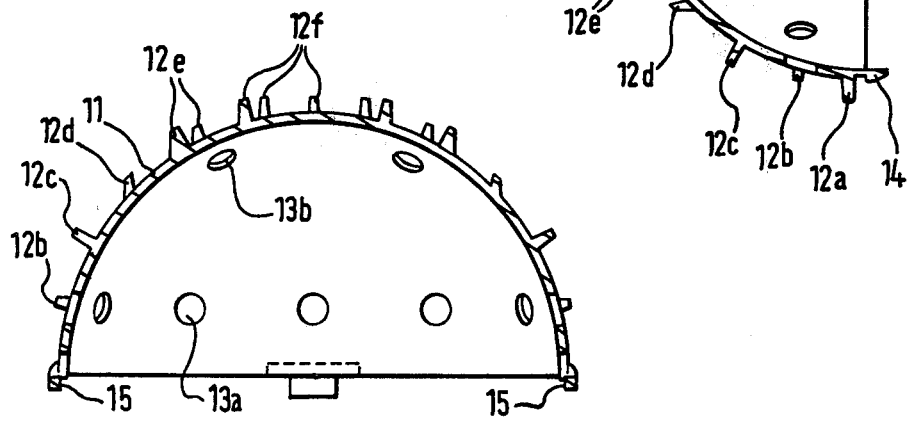

BALL AND METHOD FOR MAKING IT

This invention relates to balls, particularly for cricket or hockey.

In addition to cricket and hockey balls, the invention is also applicable to other types of ball with a casing and a hard core, such as balls for baseball, golf, rounders, stoolball and fives.

A hockey ball is similar to a cricket ball apart from colour and the other types of ball have other variants. When reference is made hereinafter to a cricket ball it is intended, where the context permits, that this term should include a hockey ball and balls of the other types mentioned.

A traditional cricket ball has a core of cork pieces and twine, hand-rolled into a sphere and covered with a hand-sewn leather cover which is polished to a deep gloss. This type of ball is prohibitively expensive for all but a relatively restricted use and many cheaper substitutes are known and used. However, most neither feel, look nor have in use like traditional cricket balls. One recent approach has been to slush mould a cover onto a core. In this procedure pins are pushed into the core to support the latter in the mould while the cover material, e.g. polyvinylchloride or like elastomer material is poured into the mould. After the cover has set the pins are removed. The main problem with this procedure is that of ensuring concentricity of the core in the mould. Any eccentricity leads to variations in the thickness of the cover, which may lead to localised softness or cracking, and also to degree of bias in the finished ball, which is undesirable and possibly dangerous in view of its unpredicability.

According to a first aspect of the present invention, there is provided a method of making a ball comprising the steps of enclosing a preformed spherical core in a supporting shell provided with a plurality of spaced projections extending substantially radially therefrom with the tips co-spherical, supporting the core and a shell in a spherical mould by means of the said projections and moulding a covering material over the core and shell.

The supporting shell may be formed of two half shells, conveniently identical, having inter-engaging formations so as to clip together.

The covering material is preferably injection moulded over the core and shell.

The supporting shell is preferably provided with apertures so that any small gaps between the shell and the core may be filled with covering material during the moulding step.

According to a second aspect of the invention, there is provided a supporting shell for fitting over a spherical core comprising a pair of half-spherical shells clipped or adpated to be clipped together, and having a plurality of spaced projections extending substantially radially therefrom with the tips located on a sphere.

According to a third aspect of the invention, there is provided a ball when made by a method according to the invention as set forth above.

The invention will be further described with reference to the accompanying drawings which illustrate a preferred form of the invention and in which:

FIG. 1 is an elevation of a preferred form of half shell for a supporting shell;

FIG. 2 is a section on the line II—II of FIG. 1;

FIG. 3 is a section on the line III—III of FIG. 1;

Figure 4:
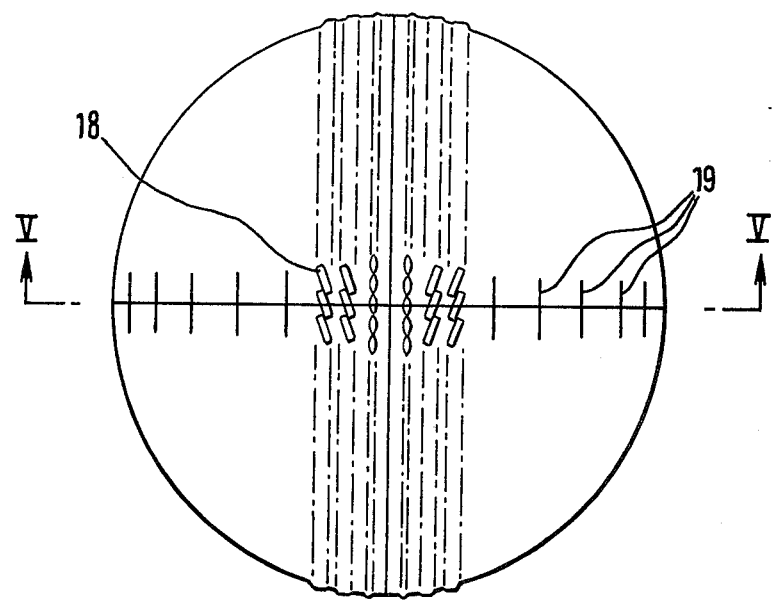
FIG. 4 is an elevation of a completed ball.

Turning first to FIGS. 1 to 3, there is shown a half shell 11 moulded in nylon 66 or similar material and being of hemi-spherical form. The outer surface of the half shell 11 is provided with six rows of projections 12a to 12f respectively. All the projections terminate substantially on a sphere, i.e. with a tolerance of the order of 0.2 mm, since the projections are designed to support the shell centrally in a spherical mould. The shape of the projections, particularly in rows of 12c, is designed for each of draw-off after moulding. There are also two rows of circular apertures 13a and 13b. To clip the hald-shell 11 to a similar half shell, each is provided with a pair of hooks 14 and a pair of lips 15 for interengagement with the lips 15 and hooks 14 of the matching similar half shell respectively.

In the manufacture of a cricket ball according to a preferred mode of the invention, a pair of half shells 11 are clipped together over a spherical core 16 (see FIG. 5) made by moulding cork chippings and rubber together and the assembly of core 16 and half shells 11, which together form a supporting shell for the core, is supported concentrically in a spherical injection mould cavity by means of the projections 12a to 12f. An outer casing material, e.g. polyvinylchloride having a Shore hardness of about 75, is then injected into the mould to form a casing 17. In order to give an appearance and physical characteristics similar to those of a conventional cricket ball, the mould cavity may be produced by an electro-forming or photo-etching process using a conventional hand-made ball as a master. It can be seen from FIGS. 4 and 5 that the conventional seam is reproduced at 18 and the surface also takes on a leather grain texture and has reproduced the witness lines 19 of a hand-made leather cover. For a cricket ball, the ball will have a highly polished red finish, and a hockey ball will be white. Alternative characteristic surface formations will be reproduced on other types of ball.

Figure 5:
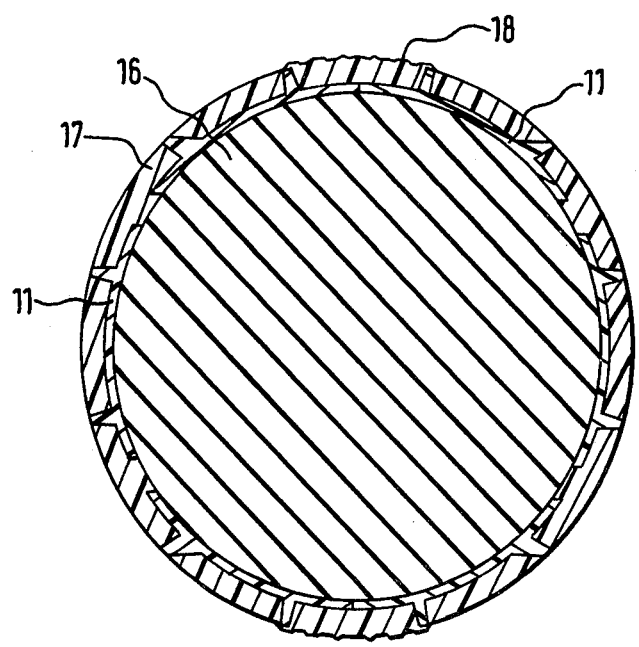
FIG. 5 is a section on the line V—V of FIG. 4.

Various modifications may be made within the scope of the invention. For instance, the half-shells 11 could be moulded of the same material, e.g. polyvinylchloride composition of appropriate hardness, as the casing 17. The shell and casing would then fuse into a substantially integral unit during moulding, and possible problems arising from poor bonding between the shells and the casing would be avoided. The boundary lines between these parts, as shown in FIG. 5, would then be indiscernible, except possibly in a microscopic or other laboratory examination.

I claim:

1. In a method for making a ball having a core and a cover molded over the core, the improvement comprising the steps of providing a preformed spherical core, assembling a supporting shell from a plurality of preformed shell elements so as to enclose said core in said supporting shell, the shell elements having a plurality of spaced projections extending substantially radially therefrom, the projections having tips which define an imaginary sphere substantially concentric with said spherical core, supporting the core and shell in a spherical mold by means of said projections and molding a covering material about over the core and shell.

2. A ball made by the method of claim 1.

3. A method as claimed in claim 1, in which the covering material is injection moulded over the core and shell.

4. A method as claimed in claim 1, in which the supporting shell is provided with apertures so that any small gaps between the shell and the core may be filled with covering material during the moulding step.

5. A method as claimed in claim 1, in which the shell is moulded in the same material as is used for the covering material.

6. A method as claimed in claim 1, in which the supporting shell is formed of two half-shells having inter-engaging formations so as to clip together.

7. A method as claimed in claim 6, in which the two half-shells are identical.

* * * * *